US011005370B2

(12) United States Patent
Tt et al.

(10) Patent No.: US 11,005,370 B2
(45) Date of Patent: May 11, 2021

(54) DYNAMIC PHASE CHANGE MECHANISM IN MULTI-PHASE CONVERTERS

(71) Applicant: Texas Instruments Incorporated, Dallas, TX (US)

(72) Inventors: Anandha Ruban Tt, Namakkal (IN); Preetam Charan Anand Tadeparthy, Bangalore (IN); Vikram Gakhar, Bangalore (IN); Muthusubramanian Nv, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 617 days.

(21) Appl. No.: 15/094,866

(22) Filed: Apr. 8, 2016

(65) Prior Publication Data

US 2016/0301311 A1 Oct. 13, 2016

(30) Foreign Application Priority Data

Apr. 10, 2015 (IN) .......................... 1878/CHE/2015

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
CPC . H02M 2001/0045; H02M 2001/0032; H02M 2001/0012; H02M 2001/0009; H02M 2001/0025; H02M 3/1584; H02M 3/156; H02M 3/1588; H02M 3/158; H02M 3/1582; H02M 3/157; H02M 3/33507; H02M 3/1563; H02M 3/155; H02M 2003/1586; Y02B 70/16; Y02B 70/1466; H02J 1/102; H03F 2200/351; H02H 7/1213
USPC .......................... 323/268, 271–272, 282–288
See application file for complete search history.

(56) References Cited

U.S. PATENT DOCUMENTS

| | | | | |
|---|---|---|---|---|
| 9,048,686 B2* | 6/2015 | Yamadaya | ............... | H02J 1/102 |
| 2007/0274108 A1* | 11/2007 | Jacques | ............. | H02M 3/33507 |
| | | | | 363/21.12 |
| 2014/0333270 A1* | 11/2014 | Young | ................ | H02M 3/1584 |
| | | | | 323/234 |
| 2015/0008890 A1* | 1/2015 | Sasao | ...................... | H02M 1/08 |
| | | | | 323/271 |
| 2015/0370298 A1* | 12/2015 | Henzler | .................... | G06F 1/26 |
| | | | | 713/310 |

(Continued)

*Primary Examiner* — Fred E Finch, III
*Assistant Examiner* — Kevin H Sprenger
(74) *Attorney, Agent, or Firm* — Mark Allen Valetti; Charles A. Brill; Frank D. Cimino

(57) ABSTRACT

The disclosure provides a multi-phase converter. The multi-phase converter includes a controller and one or more switches. The one or more switches are coupled to the controller, and configured to receive an input voltage. A switch of the one or more switches is activated by the controller in a predefined phase of N phases in the multi-phase converter, where N is a positive integer. A processing unit is coupled to the controller and estimates a number of phases to be activated based on a load current. The processing unit also stores a threshold current limit corresponding to each phase of the N phases based on the input voltage and a switching frequency.

18 Claims, 4 Drawing Sheets

(56) References Cited

U.S. PATENT DOCUMENTS

2016/0116549 A1\* 4/2016 Mathew ............. H02M 3/1584
702/60
2016/0259355 A1\* 9/2016 Farber .................... G05F 1/575

\* cited by examiner

US 11,005,370 B2

DYNAMIC PHASE CHANGE MECHANISM IN MULTI-PHASE CONVERTERS

CROSS REFERENCES TO RELATED APPLICATIONS

This application claims priority from India provisional patent application No. 1878/CHE/2015 filed on Apr. 10, 2015 which is hereby incorporated by reference in its entirety.

TECHNICAL FIELD

The present disclosure is generally related to multi-phase converters, and more particularly to dynamic phase change mechanism in multi-phase converters.

BACKGROUND

DC-DC converters are circuits used to shift the DC level of a voltage source. In most cases, these DC-DC converters are used to regulate a voltage source to a fixed output voltage. A multi-phase DC-DC converter is just a parallel connection of multiple single-phase DC-DC converter units. The main reason for the evolution of multiphase DC-DC converters is the need for higher load currents. Since a single-phase DC-DC converter cannot supply current above a certain limit, multiple units of single-phase DC-DC converters are operated in parallel to meet the current demand.

Multi-phase DC-DC converters are generally used in high current applications for better thermal management while enabling use of power stage components (inductors, capacitors, switches) with lower ratings and cost. A multi-phase DC-DC converter operates in multiple phases. The multi-phase DC-DC converter is designed to provide equal current to a load through all the phases.

In multiphase DC-DC converters, it is efficient to use maximum number of phases at high load currents. In low load conditions, the switching losses will become dominant and it is efficient to drop some phases. The threshold currents to change the phases, is chosen such that the DC-DC converter operates with maximum efficiency. The threshold currents are not constant with varying input voltage and switching frequency. Using constant thresholds currents for all input voltages and switching frequencies results in operating at sub optimal number of phases.

SUMMARY

According to an aspect of the disclosure, a multi-phase converter is disclosed. The multi-phase converter includes a controller and one or more switches. The one or more switches are coupled to the controller, and configured to receive an input voltage. A switch of the one or more switches is activated by the controller in a predefined phase of N phases in the multi-phase converter, where N is a positive integer. A processing unit is coupled to the controller and estimates a number of phases to be activated based on a load current. The processing unit also stores a threshold current limit corresponding to each phase of the N phases based on the input voltage and a switching frequency.

BRIEF DESCRIPTION OF THE VIEWS OF DRAWINGS

DETAILED DESCRIPTION OF THE EMBODIMENTS

Figure 1:
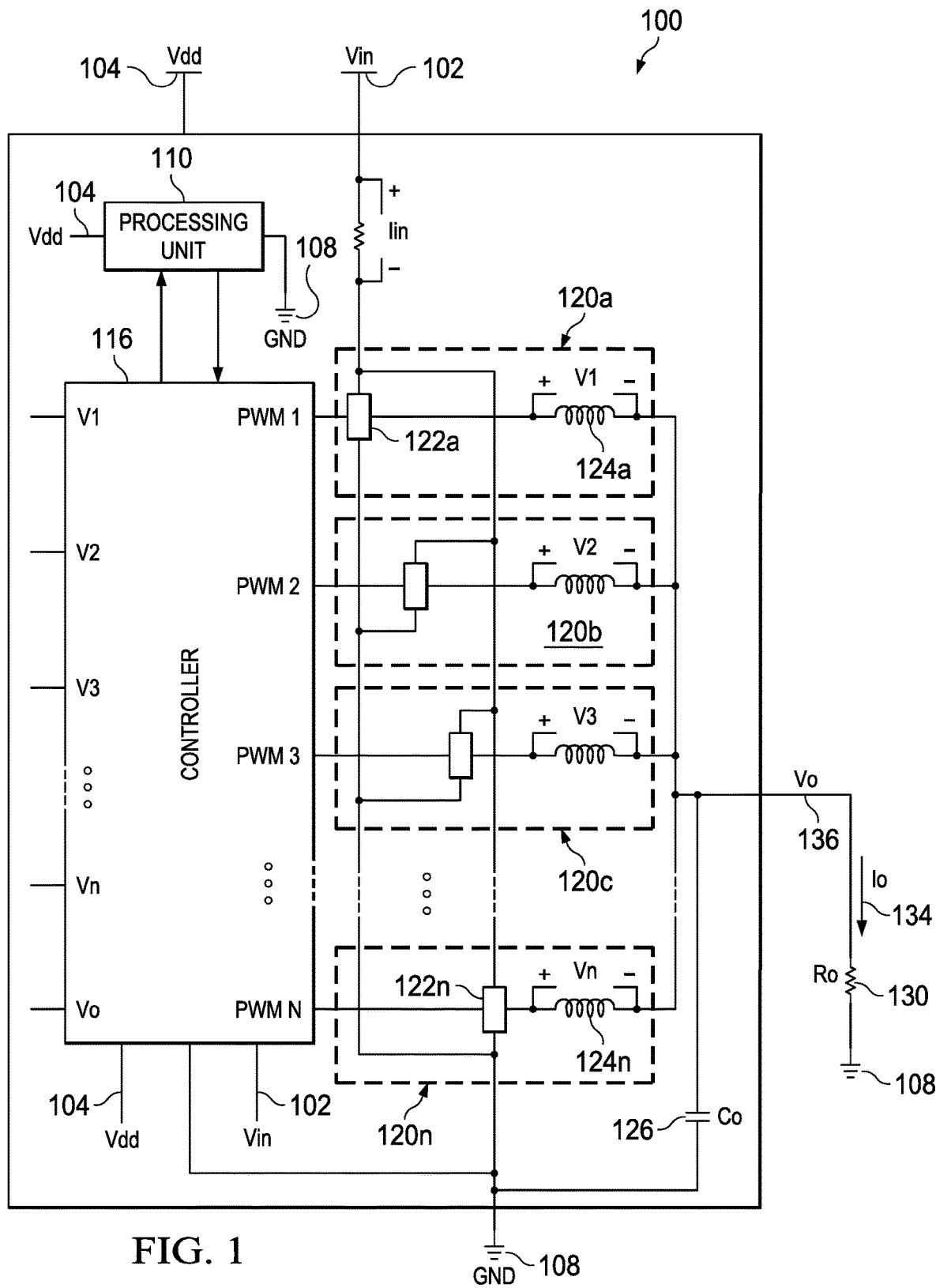
FIG. 1 illustrates a multi-phase converter, according to an embodiment.

FIG. 1 illustrates a multi-phase converter 100, according to an embodiment. The multi-phase converter 100, in one example, is a DC-DC multi-phase buck converter. In another example, the multi-phase converter 100 is a DC-DC multi-phase boost converter. In yet another example, the multi-phase converter 100 is an isolated DC-DC converter. The multi-phase converter 100 includes a processing unit 110, a controller 116, one or more switches illustrated as 120a, 120b to 120n and a load Ro 130. The multi-phase converter 100 receives an input voltage Vin 102 and a supply voltage Vdd 104. The multi-phase converter 100 drives the load Ro 130.

The processing unit 110 receives the supply voltage Vdd 104 and is coupled to a ground terminal GND 108. The controller 116 is coupled to the processing unit 110. In one example (not shown), the processing unit 110 is part of the controller 116. In another example (not shown), the functions of the processing unit 110 are performed by the controller 116. The controller 116 receives the supply voltage Vdd 104 and is coupled to the ground terminal GND 108. The one or more switches 120a to 120n are coupled to the controller 116. Each switch of the one or more switches includes a switching element and an inductor. For example, the switch 120a includes a switching element 122a and an inductor 124a. Similarly, the switch 120n includes a switching element 122n and an inductor 124n. In one example, the inductance of inductor in each switch of the one or more switches is the same. Each switching element receives the input voltage Vin 102 and is coupled to the ground terminal GND 108.

The load Ro 130 is coupled between the one or more switches 120a to 120n and the ground terminal GND 108. A load capacitor Co 126 is coupled in parallel to the load Ro 130. The load capacitor Co 126 is coupled between the one or more switches 120a to 120n and the ground terminal GND 108. An output voltage Vo 136 is generated across the load Ro 130. The multi-phase converter 100 may include one or more additional components known to those skilled in the relevant art and are not discussed here for simplicity of the description.

The operation of the multi-phase converter 100 illustrated in FIG. 1 is explained now. The controller 116 receives one or more differential voltages V1, V2, V3 to VN. The differential voltage V1 is generated across the inductor 124a in the switch 120a. Similarly, the differential voltage VN is generated across the inductor 124n in the switch 120n. The controller 116 also receives the output voltage Vo 136 along with the one or more differential voltages V1, V2, V3 to VN. The controller 116 generates one or more PWM (pulse width modulated) signals illustrated as PWM1, PWM2, PWM3 to PWMN. Each switching element receives a PWM signal. For example, the switching element 122a receives PWM1, and the switching element 122n receives the PWMN.

A number of switches is equal to a number of phases of the multi-phase converter 100. For example, in a 6 phase multi-phase converter, 6 switches are used. Thus, the multi-phase converter 100 is an N phase converter with N switches. The controller 116 activates a switch of the one or more switches 120a to 120n in a predefined phase of the N phases in the multi-phase converter 100, N is a positive integer. When a switch is activated by the controller 116, the switch provides a current to the load Ro 130 in response to the PWM signal.

A switch provides the current to the load Ro 130 in a given phase, and the current is provided through the inductor in the switch. A load current Io 134 is the current passing through the load Ro 130. The differential voltage V1, generated across the inductor 124a in the switch 120 is provided to the controller 116.

The controller 116 provides single-phase power loss across the load Ro 130 to the processing unit 110. The controller 116 measures the single-phase power loss at multiple values of the load current Io 134. The controller 116 also measures a changeover load current. The changeover load current represents a point of discontinuity in the single-phase power loss. The controller 116 also measures a constant loss from power loss in N phases at no load and from power loss in single-phase at no load.

The processing unit 110 generates a first polynomial function to fit values of single-phase power loss which are less than the point of discontinuity. The processing unit 110 also generates a second polynomial function to fit values of the single-phase power loss which are greater than the point of discontinuity. The processing unit 110 subtracts the constant loss from the first polynomial function and the second polynomial function to generate the single-phase power loss curve.

The processing unit 110 measures power loss for each phase of the N phases at multiple values of load current from the single-phase power loss curve. The processing unit 110 also estimates a number of phases to be activated using the measured power loss for each phase of the N phases. For a given input voltage Vin 102 and switching frequency, the processing unit 110 maintains a look-up table of threshold current limit corresponding to each phase of the N phases. The threshold current limit is a maximum load current Io 134 passing through the load Ro 130 during a phase of the N phases. In one example, at initialization of the multi-phase converter 100, the processing unit 110 utilizes a pre-stored look-up table for threshold current limits corresponding to each phase of the N phases. This pre-stored look-up table is used before the single-phase power loss curve is generated.

In one version, the controller 116 keeps providing values of single-phase power loss to the processing unit 110, and the processing unit 110 dynamically updates the look-up table. This improves the accuracy of the single-phase power loss curve which in turn improves the accuracy of the threshold current limit corresponding to each phase of the N phases.

The processing unit 110 configures the controller 116 for a given input voltage Vin 102 and the switching frequency. The processing unit 110 configures the controller 116 based on the estimated number of phases to be activated, and the threshold current limit corresponding to each phase of N phases.

Based on configuration by the processing unit 110, the estimated number of phases are activated in the controller 116. The controller 116 activates the switch 120a corresponding to a first phase of the N phases. The controller 116 activates the switch 120b when a threshold current limit corresponding to the first phase is reached. The switch 120b corresponds to a second phase of the N phases. Thus, both the switch 120a and the switch 120b are activated when the threshold current limit of the first phase is reached. The multi-phase converter 100 operates in 2 phases when the load current Io 134 is greater than the threshold current limit of the first phase.

Similarly, when a threshold current limit of the second phase is reached, the switch 120c is also activated along with the switch 120a and the switch 120b. The switch 120c corresponds to a third phases of the N phases. The multi-phase converter 100 operates in 3 phases when the load current Io 134 is greater than the threshold current limit of the second phase. In a similar order, the switch 120c is inactivated when the load current Io 134 is below the threshold current limit of the second phase while both the switch 120a and the switch 120b remain active.

Thus, the multi-phase converter 100 supports dynamic phase change when the input voltage Vin 102, the switching frequency or other similar factors such as PVT (process, voltage, temperature) conditions are changed. This allows the multi-phase converter 100 to be used in stand-alone devices like laptops as it is an energy efficient solution which becomes critical at low battery levels. The multi-phase converter 100 provides varying threshold currents with varying input voltage Vin 102 and switching frequency. This allows the multi-phase converter to operate at optimal number of phases in all conditions.

Figure 2:
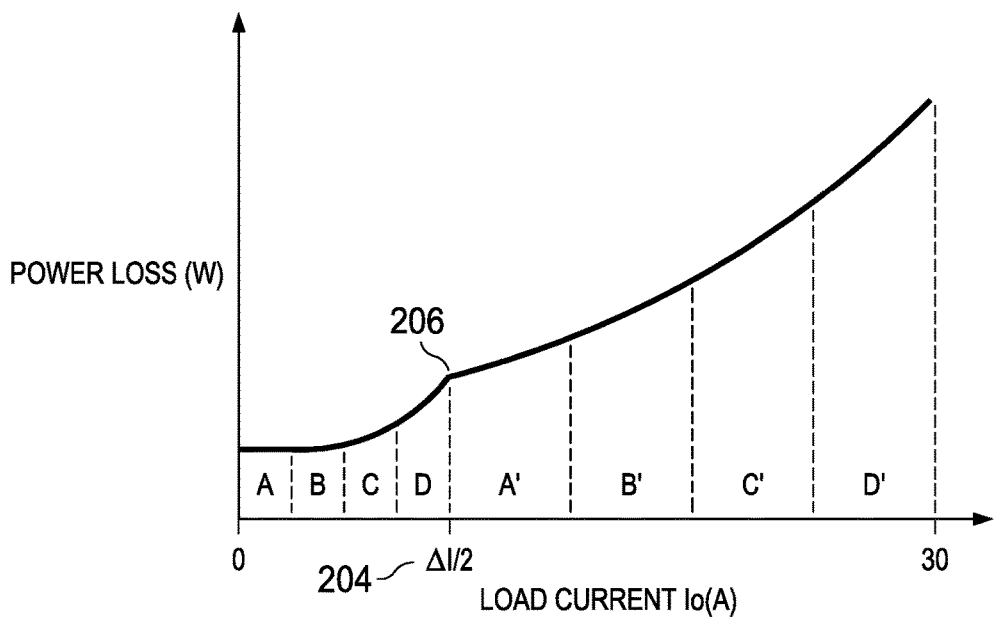
FIG. 2 illustrates operation of a processing unit in a multi-phase converter, according to an embodiment.

FIG. 2 illustrates operation of a processing unit in a multi-phase converter, according to an embodiment. The processing unit is similar to the processing unit 110 illustrated in FIG. 1. The operation is explained in connection with the multi-phase converter 100 and the processing unit 110. The controller 116 measures the single-phase power loss at multiple values of the load current Io 134. The controller 116 also measures a changeover load current ($\Delta I/2$) 204. The changeover load current ($\Delta I/2$) 204 represents a point of discontinuity 206 in the single-phase power loss. The single-phase power loss at multiple values of the load current Io 134 and the changeover load current ($\Delta I/2$) 204 are provided to the processing unit 110.

The processing unit 110 generates a first polynomial function to fit values of single-phase power loss which are less than the point of discontinuity 206. The processing unit 110 also generates a second polynomial function to fit values of the single-phase power loss which are greater than the point of discontinuity 206. For better accuracy of the polynomial functions, multiple samples are used for best fit. In the example shown in FIG. 2, A, B, C, D are four samples used for generating the first polynomial function, and A', B', C' and D' are four samples used for generating the second polynomial function. The number of samples used varies depending on the accuracy requirement.

As illustrated in FIG. 2, the single phase power loss at multiple values of the load current Io 134 is divided into two regions and each region includes four sub-regions. A threshold current to switch from one phase to two phases is increased to a maximum per-phase current limit. This ensures that the multi-phase converter 100 operates in a single-phase mode for the multiple values of the load current Io 134. Once the sample from all the sub-regions is obtained, polynomial functions are used to fit values of the single-phase power loss. In one example, a cubic and a square polynomial functions are used to fit values of single-phase power loss which are less than the point of discontinuity 206 and which are greater than the point of discontinuity 206 respectively. The processing unit 110 subtracts the constant loss from the first polynomial function and the second polynomial function to generate the single-phase power loss curve.

In the multi-phase converter 100 when two phases are active, the total power loss is defined as:

$$P(Io, 2) = 2P\left(\frac{Io}{2}, 1\right) \quad (1)$$

Thus, the total power loss in the multi-phase converter 100 when N phases are active is defined as:

$$P(Io, N) = NP\left(\frac{Io}{N}, 1\right) \quad (2)$$

The above equation illustrates that the power loss function of N phases directly depends on the power loss function of a single phase. The processing unit 110 measures power loss for each phase of the N phases at multiple values of the load current Io 134 from the single-phase power loss curve using equation 2.

The processing unit 110 also estimates a number of phases to be activated using the measured power loss for each phase of the N phases. For a given input voltage Vin 102 and switching frequency, the processing unit 110 maintains a look-up table of threshold current limit corresponding to each phase of the N phases. The threshold current limit is a maximum load current Io 134 passing through the load Ro 130 during a phase of the N phases. Thus, the multi-phase converter 100 provides varying threshold currents with varying input voltage Vin 102 and switching frequency. This allows the multi-phase converter 100 to operate at optimal number of phases in all conditions.

The processing unit 110, in one version, also measure hysteresis associated with the multi-phase converter 100. This is explained now.

In multi-phase converter 100, an output ripple current is a sum of currents through inductors in N phases. The currents in the different phases are shifted from one another by TS/K, where K is a number of active phases and TS is a switching time period. When added, an amplitude of output ripple current will be less than or equal to that of a ripple in the individual phases.

In high power multi-phase converters, whenever the load current Io 134 increases, more phases are added immediately. Otherwise there is a risk of damaging one or more switches 120a to 120n including the inductors in these switches. A low pass filter cannot be used as the response time required in multi-phase converter 100 is very high. Hence, the output ripple current is sensed along with the load Ro 130. If there is no hysteresis, when the threshold current limit corresponding to a phase is reached, the output current ripple will make the multi-phase converter 100 to switch back and forth between two phases.

$I_{N,N+1}$ is a threshold current limit to be switched from N to N+1 phases and $I_{N+1,N}$ is the threshold current limit to switch back from N+1 to N phases, where N is a positive integer. If $I_{Thr(N,N+1)}$ is the actual current level at which the multi-phase converter 100 is expected to switch from N to N+1 phases or vice versa, then a new threshold current limit to switch from N to N+1 phase is defined as:

$$I_{N,N+1} = I_{Thr(N,N+1)} + \frac{\Delta Iout(N)}{2} \quad (3)$$

where, $\Delta$Iout is the output ripple current amplitude for N phases.

Similarly, a new threshold current limit to switch from N+1 to N phase is defined as:

$$I_{N+1,N} = I_{Thr(N,N+1)} - \frac{\Delta Iout(N+1)}{2} \quad (4)$$

where, $\Delta$Iout(N+1) is the output ripple current amplitude for N+1 phases.

The hysteresis current $I_{HST}$ is a difference between $I_{N,N+1}$ and $I_{N+1,N}$ and is defined as:

$$I_{HST} = \frac{\Delta Iout(N) + \Delta Iout(N+1)}{2} \quad (5)$$

Thus, the hysteresis current is an average of the output ripple current amplitude for N phases and the output ripple current amplitude for the N+1 phases. The processing unit 110 uses the threshold current limits with or without hysteresis depending upon user requirements.

Figure 3:
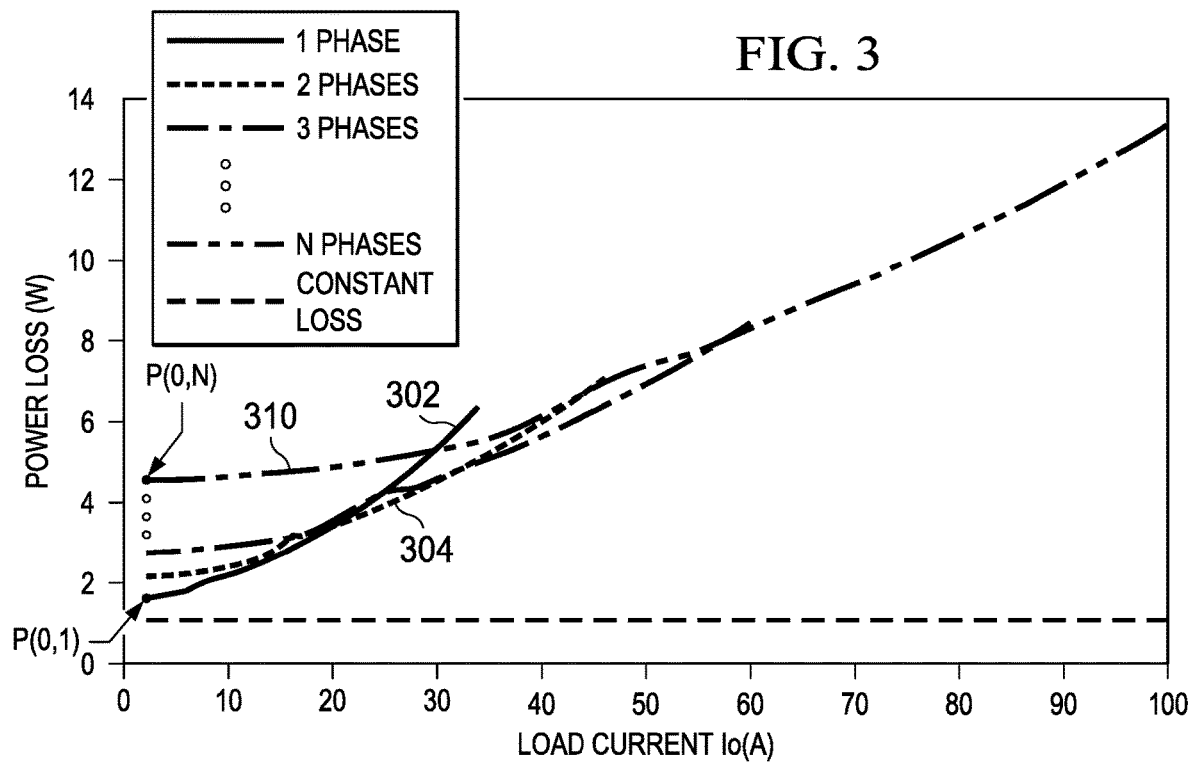
FIG. 3 is a graph to illustrate operation of a controller in a multi-phase converter, according to an embodiment.

FIG. 3 is a graph to illustrate operation of a controller in a multi-phase converter, according to an embodiment. The controller is similar to the controller 116 illustrated in FIG. 1. The operation is explained in connection with the multi-phase converter 100 and the controller 116. The FIG. 3 illustrates a measurement of a constant loss by the controller 116. When a multi-phase converter 100 is implemented on a board, there are additional loss components on the board other than the switches 120a to 120n and the inductors in these switches.

These additional loss components are independent of the load Ro 130 and the number of phases in the multi-phase converter 100. The power loss due to these additional loss components, is termed as the constant loss. During measurement of single-phase power loss at multiple values of the load current Io 134, it is difficult to isolate the constant loss.

The graph in FIG. 3 represents power loss in the multi-phase converter 100 when no load is coupled to the multi-phase converter 100. Thus, the load current Io is zero. Each curve represents power loss when a particular number of phases are active. For example, curve 302 represents power loss when 1 phase or single-phase is active. Curve 304 represents power loss when 2 phases are active. Similarly, curve 310 represents power loss when N phases are active.

P(0,1), which is at a beginning of the curve 302, represents power loss when single-phase is active, and P(0,N), which is at a beginning of the curve 304, represents power loss when N phases are active. The constant loss is defined as:

$$\text{Constant Loss} = P(0, 1) - \frac{P(0, N) - P(0, 1)}{5} \quad (6)$$

The constant loss is thus measured from the power loss in N phases at no load and from the power loss in single-phase at no load.

The controller 116 also measures a changeover load current from an output ripple current amplitude for single-phase. The output ripple current amplitude for single phase is defined as:

$$\Delta I = \frac{VinDD'}{LFs} \quad (7)$$

where, Vin the input voltage 102, D is duty cycle of the input voltage Vin 102, Fs is switching frequency and L is inductance of the inductor 124a. The changeover load current is defined as ΔI/2. The changeover load current represents a point of discontinuity in the single-phase power loss.

Figure 4:
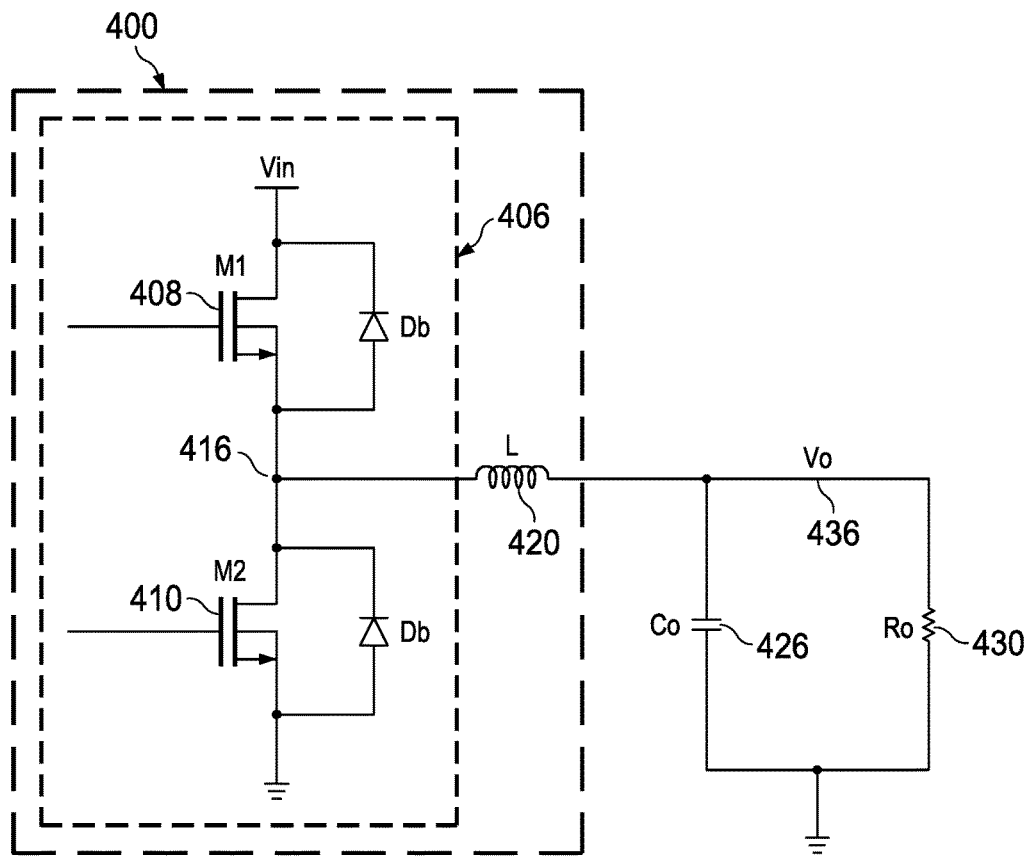
FIG. 4 illustrates a switch, according to an embodiment.

FIG. 4 illustrates a switch 400, according to an embodiment. The switch 400 is similar to at least one switch of the one or more switches 120a to 120n illustrated in FIG. 1. The switch 400 is explained in connection with the switch 120a in the multi-phase converter 100. The switch 400 includes a switching element 406 similar to the switching element 122a. The switch 400 also includes an inductor L 420 similar to the inductor 124a.

The switching element 406 includes a first transistor M1 408 and a second transistor M2 410. The first transistor M1 408 receives an input voltage Vin, and the second transistor M2 410 is coupled to a ground terminal. The first transistor M1 408 is coupled to the second transistor M2 410 at a common node 416. A gate terminal of each of the first transistor M1 408 and the second transistor M2 410 is coupled to a controller similar to the controller 116, and receives PWM signal from the controller.

A load Ro 430 is coupled between the switch 400 and the ground terminal. A load capacitor Co 426 is coupled in parallel to the load Ro 430. The load capacitor Co 426 is coupled between the switch 400 and the ground terminal. The load Ro 430 and the load capacitor Co 426 are similar in connection to the load Ro 130 and the load capacitor Co 126 respectively. An output voltage Vo 436 is generated across the load Ro 430. The switch 400 may include one or more additional components known to those skilled in the relevant art and are not discussed here for simplicity of the description.

The operation of the switch 400 illustrated in FIG. 4 is explained now. The multi-phase converter 100 includes multiple switches similar to the switch 400. A number of switches is equal to a number of phases of the multi-phase converter 100. For example, in a 6 phase multi-phase converter, 6 switches are used. Thus, the multi-phase converter 100 is an N phase converter with N switches. The controller activates a switch of the one or more switches in a predefined phase of the N phases in the multi-phase converter 100, N is a positive integer. When the switch 400 is activated by the controller, the switch 400 provides a current to the load Ro 430 in response to the PWM signal.

The switch 400 provides the current to the load Ro 430 in a given phase, and the current is provided through the inductor L 420 in the switch 400. A load current is the current passing through the load Ro 430. The differential voltage generated across the inductor L 420 in the switch 400 is provided to the controller similar to the controller 116. In one example, the controller activates the switch 400 corresponding to a first phase of the N phases.

The controller activates a second switch, which is similar in connection and operation to the switch 400, when a threshold current limit corresponding to a first phase is reached. The second switch corresponds to a second phase of the N phases. Thus, both the switch 400 and the second switch are activated when the threshold current limit of the first phase is reached. The multi-phase converter 100 operates in 2 phases when the load current is greater than the threshold current limit of the first phase. This allows the multi-phase converter 100 to operate at optimal number of phases in all conditions. Thus, the multi-phase converter 100 supports dynamic phase change when the input voltage Vin, the switching frequency or other similar factors such as PVT conditions are changed.

Figure 5:
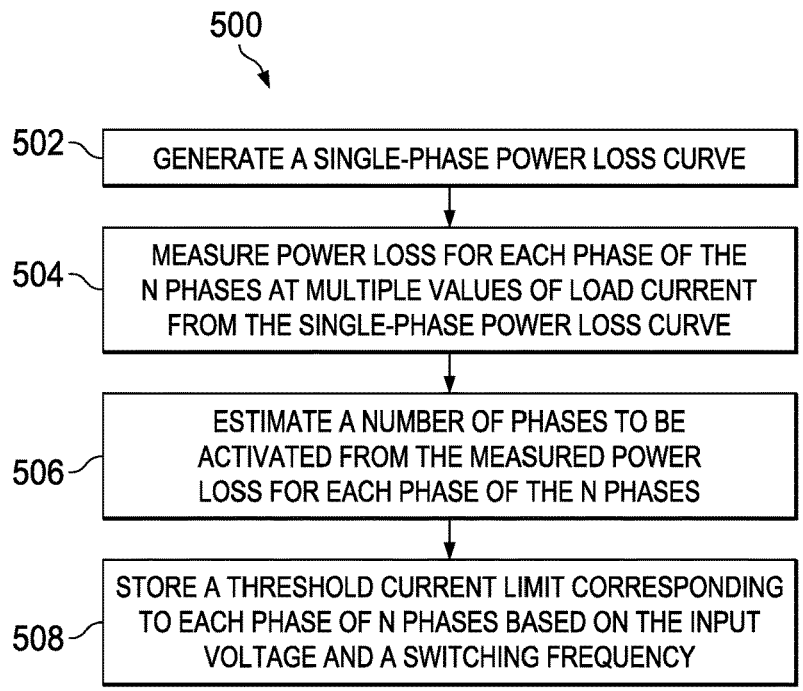
FIG. 5 is a flowchart to illustrate a method of operation of a multi-phase converter, according to an embodiment.

FIG. 5 is a flowchart 500 to illustrate a method of operation of a multi-phase converter, according to an embodiment. The flowchart 500 is explained in connection with the multi-phase converter 100. At step 502, a single-phase power loss curve is generated. The step of generating single-phase curve involves multiple sub-steps. The single-phase power loss at multiple values of the load current is measured. For example, in multi-phase converter 100, the controller 116 provides single-phase power loss across the load Ro 130 to the processing unit 110. The controller 116 measures the single-phase power loss at multiple values of the load current Io 134. The controller 116 also measures a changeover load current.

The changeover load current represents a point of discontinuity in the single-phase power loss. A constant loss is measured from power loss in N phases at no load and from power loss in single-phase at no load. A first polynomial function is generated to fit values of single-phase power loss which are less than the point of discontinuity. A second polynomial function is generated to fit values of the single-phase power loss which are greater than the point of discontinuity. In multi-phase converter, the processing unit 110 subtracts the constant loss from the first polynomial function and the second polynomial function to generate the single-phase power loss curve.

At step 504, power loss for each phase of the N phases at multiples values of load current is measured from the single-phase power loss curve. At step 506, a number of phases to be activated is estimated from the measured power loss for each phase of the N phases. A threshold current limit corresponding to each phase of N phases is stored based on the input voltage and a switching frequency. For example, in the multi-phase converter 100, the processing unit 110 measures power loss for each phase of the N phases at multiple values of load current from the single-phase power loss curve.

The processing unit 110 also estimates a number of phases to be activated using the measured power loss for each phase of the N phases. For a given input voltage Vin 102 and switching frequency, the processing unit 110 maintains a look-up table of threshold current limit corresponding to each phase of the N phases, at step 508. The threshold current limit is a maximum load current Io 134 passing through the load Ro 130 during a phase of the N phases.

The processing unit 110 configures the controller 116 based on the estimated number of phases to be activated, and the threshold current limit corresponding to each phase of N phases. This allows a multi-phase converter using the above steps to support dynamic phase change when the input voltage Vin 102, the switching frequency or other similar factors such as PVT conditions are changed.

Figure 6:
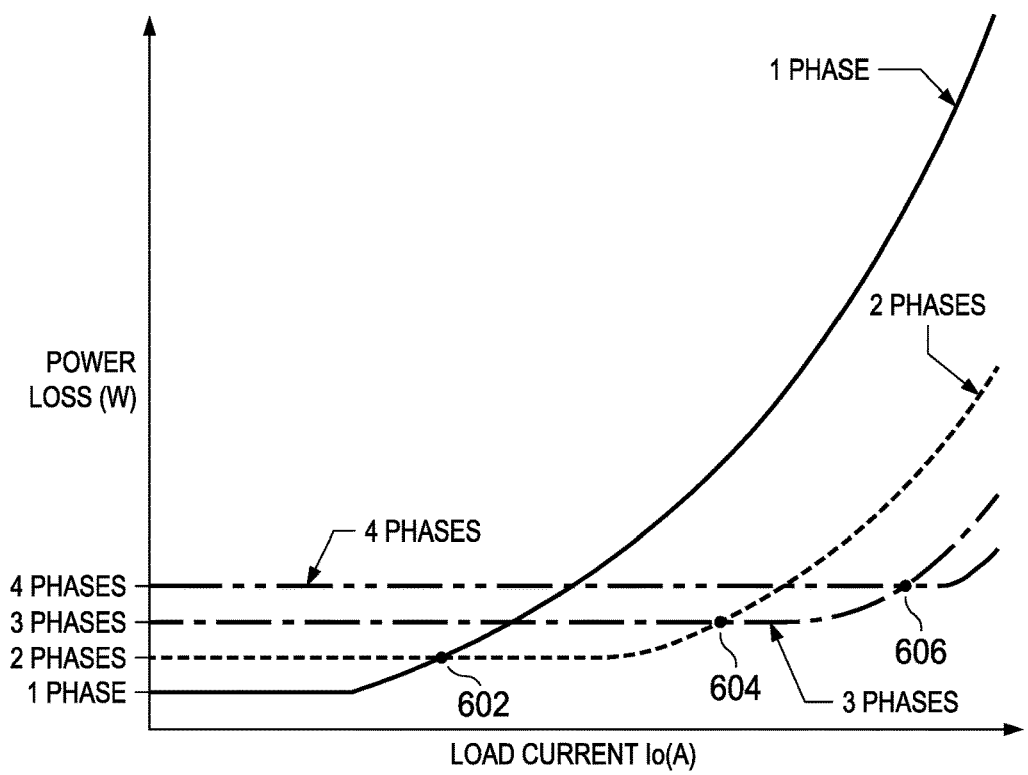
FIG. 6 is a graph to illustrate power loss in a multi-phase converter, according to an embodiment.

FIG. 6 is a graph to illustrate power loss in a multi-phase converter, according to an embodiment. The graph is explained in connection with the multi-phase converter 100 illustrated in FIG. 1. The graph provides power loss across the load Ro 130 at multiple values of the load current Io 134 and in different phases. The threshold current limit corresponding to a first phase is represented as 602, and the threshold current limit corresponding to a second phase is represented as 604, and the threshold current limit corresponding to a third phase is represented as 606.

In beginning, the multi-phase converter 100 operates in one phase. When the current limit corresponding to the first phase 602 is reached, the multi-phase converter 100 operates in two phases. When the current limit corresponding to the second phase 604 is reached, the multi-phase converter 100 operates in three phases. When the current limit corresponding to the third phase 606 is reached, the multi-phase converter 100 operates in four phases. Thus, in between 602 and 604, the multi-phase converter 100 operates in two phases, while between 604 and 606, the multi-phase converter 100 operates in three phases.

For a given input voltage Vin 102 and switching frequency, the processing unit 110 maintains a look-up table of threshold current limit corresponding to each phase of the N phases. Thus, the multi-phase converter 100 supports dynamic phase change when the input voltage Vin 102, the switching frequency or other similar factors such as PVT conditions are changed. The multi-phase converter 100 provides varying threshold currents with varying input voltage Vin 102 and switching frequency. This allows the multi-phase converter to operate at optimal number of phases in all conditions.

Figure 7:
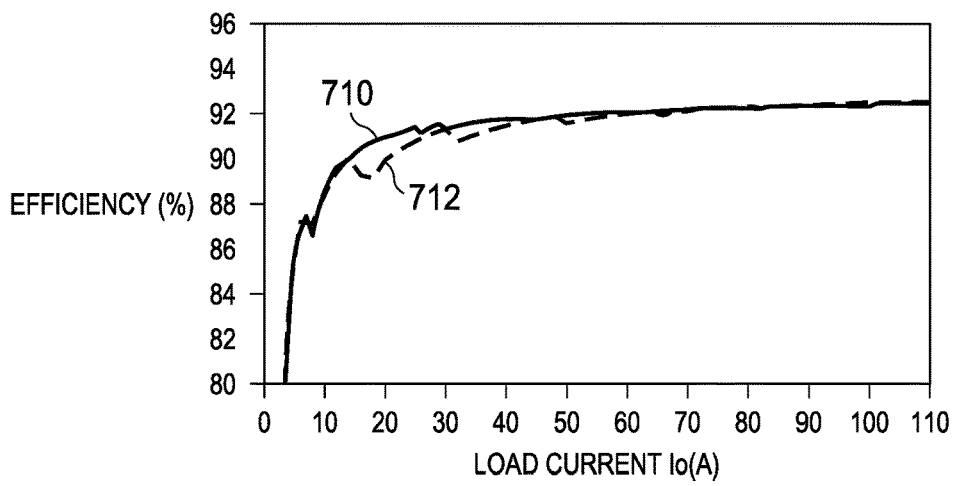
FIG. 7 is a graph to illustrate efficiency curve of multi-phase converters, according to an embodiment.

FIG. 7 is a graph to illustrate efficiency curve of multi-phase converters, according to an embodiment. A curve 710 represents efficiency curve of a conventional multi-phase converter. A curve 712 represents efficiency curve of the multi-phase converter 100. The multi-phase converter 100 has significant efficiency improvement over the conventional multi-phase converter especially at low load current (Io).

Figure 8:
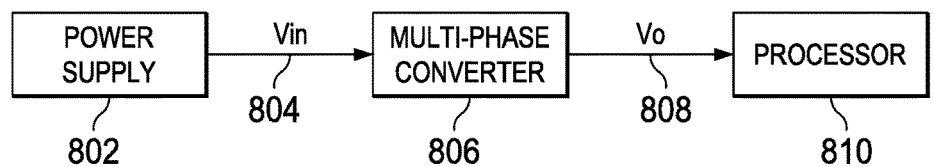
FIG. 8 illustrates a computing device, according to an embodiment.

FIG. 8 illustrates a computing device 800, according to an embodiment. The computing device 800 includes a power supply 802, a multi-phase converter 806 and a processor 810. The multi-phase converter 806 is coupled between the power supply 802 and the processor 810. The power supply 802 provides an input voltage Vin 804 to the multi-phase converter 806. The multi-phase converter 806 generates an output voltage Vo 808 in response to the input voltage Vin 804. The multi-phase converter 806 provides the output voltage Vo 808 to the processor 810.

The computing device 800 is, or is incorporated into, a mobile communication device, such as a mobile phone, a personal digital assistant, a transceiver, a personal computer, a server or any other type of electronic system. In some embodiments, the computing device 800 comprises a megacell or a system-on-chip (SoC). The processor 810 can be, for example, a CISC-type (Complex Instruction Set Computer) CPU, RISC-type CPU (Reduced Instruction Set Computer), or a digital signal processor (DSP). In one example, the processor 810 includes a memory module (e.g., random access memory (RAM)).

The memory module (which can be memory such as RAM, flash memory, or disk storage) stores one or more software applications (e.g., embedded applications) that, when executed by the processor 810, performs any suitable function associated with the computing device 800.

The multi-phase converter 806 is similar in connection and operation to the multi-phase converter 100. The input voltage Vin 804 is similar to the input voltage Vin 102 received by the multi-phase converter 100. The output voltage Vo 808 is similar to the output voltage Vo 136 generated in the multi-phase converter 100 across the load Ro 130. The input voltage Vin 804 is a varying voltage while the output voltage Vo 808 is a constant voltage.

The multi-phase converter 806 includes a controller similar to the controller 116 and a processing unit similar to the processing unit 110. The controller 116 provides single-phase power loss across the load Ro 130 to the processing unit 110. The controller 116 measures the single-phase power loss at multiple values of the load current Io 134. A constant loss is measured from power loss in N phases at no load and from power loss in single-phase at no load.

A first polynomial function is generated to fit values of single-phase power loss which are less than the point of discontinuity. A second polynomial function is generated to fit values of the single-phase power loss which are greater than the point of discontinuity. In multi-phase converter, the processing unit 110 subtracts the constant loss from the first polynomial function and the second polynomial function to generate the single-phase power loss curve.

The power loss for each phase of the N phases at multiple values of load current is measured from the single-phase power loss curve. A number of phases to be activated is estimated from the measured power loss for each phase of the N phases. A threshold current limit corresponding to each phase of N phases is stored based on the input voltage and a switching frequency. For example, in the multi-phase converter 100, the processing unit 110 measures power loss for each phase of the N phases at multiple values of load current from the single-phase power loss curve.

The processing unit 110 also estimates a number of phases to be activated using the measured power loss for each phase of the N phases. For a given input voltage Vin 102 and switching frequency, the processing unit 110 maintains a look-up table of threshold current limit corresponding to each phase of the N phases. This allows the multi-phase converter 806 to support dynamic phase change when the input voltage Vin 102, the switching frequency or other similar factors such as PVT conditions are changed. The multi-phase converter 806 provides varying threshold currents with varying input voltage Vin 804 and switching frequency. This allows the multi-phase converter to operate at optimal number of phases in all conditions.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A multi-phase converter comprising:
    N switches coupled to an input voltage terminal and an output terminal, wherein N is a positive integer greater than 1;
    a processing unit configured to store a threshold current limit corresponding to an input voltage and a switching frequency of one or more of the N switches; and
    a controller coupled to the processing unit and the N switches, the controller configured to activate a number of the N switches based on a comparison of a measured load current against the threshold current limit.

2. The multi-phase converter of claim 1, wherein:
    N is equal to or greater than 3;

the threshold current limit includes a first threshold current limit and a second threshold current limit greater than the first current limit; and the controller is configured to:
- activate one of the N switches when the measured load current is below the first threshold current limit;
- activate two of the N switches when the measured load current is above the first threshold current limit and below the second threshold current limit; and
- activate three of the N switches when the measured load current is above the second threshold current limit.

3. The multi-phase converter of claim 1, wherein the controller is configured to measure a single-phase power loss at multiple values of the measured load current, and the controller is configured to provide the measured single-phase power loss to the processing unit.

4. The multi-phase converter of claim 1, wherein the controller is configured to determine a changeover load current representing a point of discontinuity in the single-phase power loss.

5. The multi-phase converter of claim 1, wherein the controller is configured to measure a constant loss of each of the N switches in an absence of a load.

6. The multi-phase converter of claim 1, wherein the processing unit is configured to generate:
- a first polynomial function to fit values of single-phase power loss which are less than a point of discontinuity; and
- a second polynomial function to fit values of single-phase power loss which are greater than the point of discontinuity.

7. The multi-phase converter of claim 6, wherein the processing unit is configured to subtract a constant loss from the first polynomial function and the second polynomial function to generate a single-phase power loss curve.

8. The multi-phase converter of claim 7, wherein the processing unit is configured to measure power loss for each of the N switches at multiple values of the measured load current from the single-phase power loss curve.

9. The multi-phase converter of claim 8, wherein the processing unit is configured to estimate the number of the N switches to be activated by the controller based on the measured power loss.

10. The multi-phase converter of claim 1, wherein the number of the activated N switches is configured to provide a current to the output terminal.

11. The multi-phase converter of claim 1, wherein:
- each of the N switches includes an inductor coupled to the output terminal; and
- the controller is configured to measure the load current based on a voltage across the inductor.

12. The multi-phase converter of claim 1, wherein the processing unit is configured to measure a hysteresis current from an average of a first output ripple current amplitude of the N switches and a output ripple current amplitude of N+1 switches.

13. The multi-phase converter of claim 1, wherein each of the N switches comprises:
- a first transistor coupled to receive the input voltage terminal;
- a second transistor coupled to the first transistor at a common node; and
- an inductor coupled between the common node and the output terminal, wherein a gate terminal of each of the first transistor and the second transistor is coupled to the controller.

14. A method comprising:
- generating a single-phase power loss curve;
- measuring power loss for each phase of N phases at multiple values of load current from the single-phase power loss curve;
- estimating a number of phases to be activated from the measured power loss for each phase of the N phases; and
- storing a threshold current limit corresponding to each phase of N phases based on an input voltage and a switching frequency.

15. The method of claim 14, wherein generating the single-phase power loss curve further comprises:
- measuring a single-phase power loss at multiple values of load current;
- measuring a changeover load current, the changeover load current represent a point of discontinuity in the single-phase power loss;
- measuring a constant loss;
- generating a first polynomial function to fit values of single-phase power loss which are less than the point of discontinuity;
- generating a second polynomial function to fit values of single-phase power loss which are greater than the point of discontinuity; and
- subtracting the constant loss from the first polynomial function and the second polynomial function.

16. The method of claim 15 further comprises measuring the constant loss from power loss in N phases and in single-phase at no load.

17. A computing device comprising:
- a power supply configured to generate an input voltage;
- a processor configured to receive an output voltage; and
- a multi-phase converter coupled between the power supply and the processor, the multi-phase converter configured to generate the output voltage in response to the input voltage, the multi-phase converter comprising:
  - a controller;
  - one or more switches coupled to the controller and configured to receive the input voltage, a switch of the one or more switches is activated by the controller in a predefined phase of N phases in the multi-phase converter, where N is a positive integer; and
  - a processing unit coupled to the controller and configured to:
    - estimate a number of phases to be activated based on a load current; and
    - store a threshold current limit corresponding to each phase of the N phases based on the input voltage and a switching frequency.

18. The computing device of claim 17, wherein the processing unit configures the controller based on:
- the estimated number of phases to be activated; and
- the threshold current limit corresponding to each phase of N phases.

* * * * *